(12) United States Patent
Choi et al.

(10) Patent No.: US 9,007,549 B2
(45) Date of Patent: Apr. 14, 2015

(54) TRANSPARENT LIQUID CRYSTAL DISPLAY DEVICE

(71) Applicants: LG Display Co., Ltd., Seoul (KR); Dong-A University Research Foundation For Industry-Academy Cooperation, Busan (KR)

(72) Inventors: Jung-Min Choi, Gumi-si (KR); Kyoung-Ho Park, Gumi-si (KR); Gi-Dong Lee, Busan (KR)

(73) Assignees: LG Display Co., Ltd., Seoul (KR); Dong-A University Research Foundation For Industy-Academy Cooperation, Busan (KR)

( * ) Notice: Subject to any disclaimer, the term of this patent is extended or adjusted under 35 U.S.C. 154(b) by 206 days.

(21) Appl. No.: 13/894,737

(22) Filed: May 15, 2013

(65) Prior Publication Data
US 2014/0211131 A1  Jul. 31, 2014

(30) Foreign Application Priority Data
Jan. 25, 2013  (KR) .................. 10-2013-0008394

(51) Int. Cl.
*G02F 1/1335* (2006.01)
*G02F 1/1333* (2006.01)
*G09G 3/36* (2006.01)
*G02B 5/22* (2006.01)

(52) U.S. Cl.
CPC .... *G02F 1/133533* (2013.01); *G02F 1/133514* (2013.01); *G02F 1/133528* (2013.01)

(58) Field of Classification Search
CPC .......... G02F 1/13737; G02F 1/133514; G02F 1/13318; G02F 1/1334; G02F 1/13476; G02F 1/13475; G02F 1/13725; C09K 19/60; C09K 19/44; G09G 3/36; G02B 5/201; G02B 5/3033; G02B 27/225; B41M 3/06
USPC ...................... 349/106, 110; 345/88; 359/891
See application file for complete search history.

(56) References Cited

U.S. PATENT DOCUMENTS

| 4,396,251 | A | * | 8/1983 | Mukoh et al. | 349/165 |
| 4,550,980 | A | * | 11/1985 | Shingu | 349/186 |
| 6,417,909 | B1 | * | 7/2002 | Yoshida et al. | 349/165 |

* cited by examiner

*Primary Examiner* — Hoan C Nguyen
(74) *Attorney, Agent, or Firm* — Brinks Gilson & Lione

(57) ABSTRACT

A transparent liquid crystal display device includes: first and second substrates facing and spaced apart from each other; a polarizing plate over an outer surface of the first substrate; first and second electrodes and a passivation layer between the first and second electrodes over an inner surface of the first substrate, the first electrode having a plate shape, the second electrode having a shape of bars; a third electrode over an inner surface of the second substrate; at least one color filter over an outer surface of the second substrate, the at least one color filter including a colored dichroic dye material; and a liquid crystal layer between the first and second substrate, the liquid crystal layer including a liquid crystal material and a black dichroic dye material.

18 Claims, 8 Drawing Sheets

TRANSPARENT LIQUID CRYSTAL DISPLAY DEVICE

CROSS REFERENCE TO RELATED APPLICATIONS

The present application claims the benefit of priority of Korean Patent Application No. 10-2013-0008394 filed in the Republic of Korea on Jan. 25, 2013, which is hereby incorporated by reference in its entirety.

FIELD OF THE DISCLOSURE

The present disclosure relates to a transparent liquid crystal display device. The present disclosure also relates to a transparent liquid crystal display device where an object image at an opposite side is apparently discriminated and an image is clearly displayed.

DISCUSSION OF THE RELATED ART

Recently, as the information age progresses, demand for display devices has increased in various forms. For example, various flat panel displays (FPDs) such as a liquid crystal display (LCD) device, a plasma display panel (PDP), a field emission display (FED) device and an organic light emitting diode (OLED) display devices have been researched. Since the FPDs have advantages such as a thin profile, a light weight and a low power consumption, cathode ray tube (CRT) devices have been widely substituted by the FPDs.

Among various FPDs, the LCD device has various features such as a high contrast ratio and superiority in displaying a moving image. The LCD device has been widely used, such as computer monitors or televisions. The LCD device includes two substrates having a pixel electrode and a common electrode, respectively, and a liquid crystal layer between the two substrates. The LCD device obtains a difference in transmittance by changing an alignment direction of liquid crystal molecules of the liquid crystal layer, thereby displaying an image.

More recently, a transparent LCD device through which a user apparently views an object image at an opposite side of the transparent LCD device has been widely researched. Since the transparent LCD device has advantages in utilization of space, interior decoration or design, the transparent LCD device may be applied to various fields. Specifically, the transparent LCD device may transmit object image at an opposite side of the transparent LCD device and clearly display an image.

SUMMARY OF THE INVENTION

Accordingly, embodiments of the present invention are directed to a display device that substantially obviates one or more of the problems due to limitations and disadvantages of the related art.

An object of the present disclosure is to provide a transparent liquid crystal display device where visibility of an opposite object and clarity of a displayed image are improved.

Another object of the present disclosure is to provide a transparent liquid crystal display device where display quality and reliability are improved due to high brightness.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages, as embodied and broadly described herein, there is provided a transparent liquid crystal display device, including: first and second substrates facing and spaced apart from each other; a polarizing plate over an outer surface of the first substrate; first and second electrodes and a passivation layer between the first and second electrodes over an inner surface of the first substrate, the first electrode having a plate shape, the second electrode having a shape of bars; a third electrode over an inner surface of the second substrate; at least one color filter over an outer surface of the second substrate, the at least one color filter including a colored dichroic dye material; and a liquid crystal layer between the first and second substrate, the liquid crystal layer including a liquid crystal material and a black dichroic dye material.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments, examples of which are illustrated in the accompanying drawings.

Figure 1:
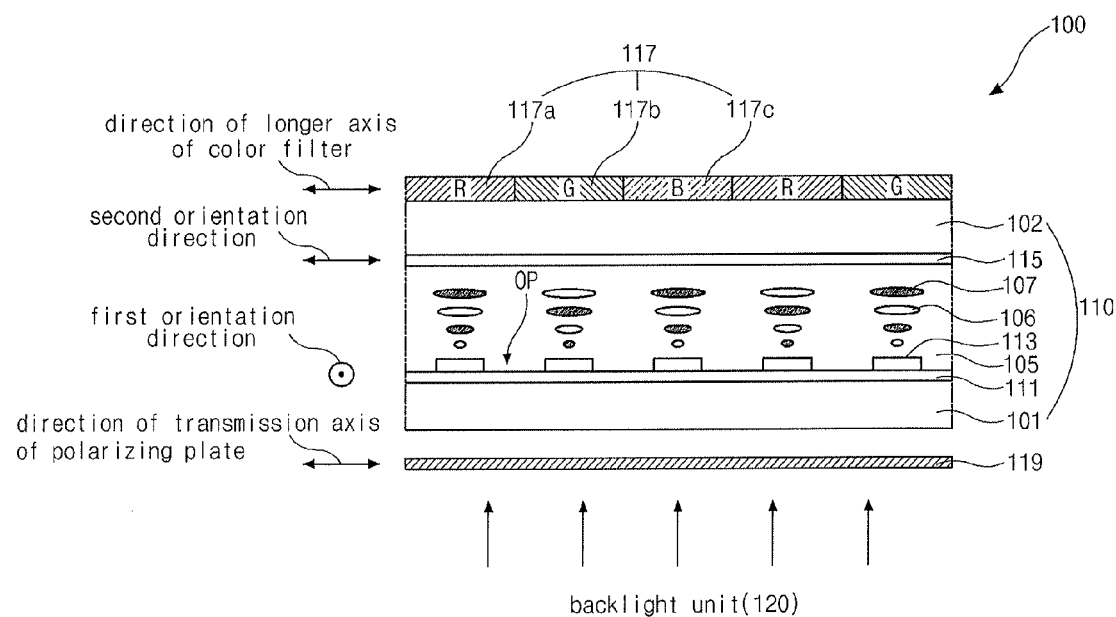
FIG. 1 shows a transparent liquid crystal display (LCD) device according to a first embodiment of the present invention.

FIG. 1 shows a transparent liquid crystal display (LCD) device according to a first embodiment of the present invention. As shown in FIG. 1, the transparent LCD device 100 includes a liquid crystal panel 110 displaying an image and a backlight unit 120 supplying a light to the liquid crystal panel 110. The liquid crystal panel 110 includes a first substrate 101 and a second substrate 102. The first substrate 101 and second substrate 102 face each other and are spaced apart, with a liquid crystal layer 105 interposed between the first and second substrates 101 and 102. As described in greater detail below, the liquid crystal layer 105 may implement a guest-host mode through twisted nematic (TN) liquid crystal material 106 and black dye material 107. The black dye material 107 may be formed of black colored dichroic dye material. In addition, the liquid crystal material 106 and the black dye material 107 each have a long axis and a short axis perpendicular to each other.

The liquid crystal material 106 and the black dye material 107 function as a host and a guest, respectively, in the guest-host mode such that the long axis of the black dye material 107 is aligned along an alignment direction of the long axis of the liquid crystal material 106. The absorption coefficient of polarized light having a polarization axis parallel to the long axis of the black dye material 107 is greater than the absorption coefficient of polarized light having a polarization axis perpendicular to the long axis of the black dye material 107.

Figure 2A:
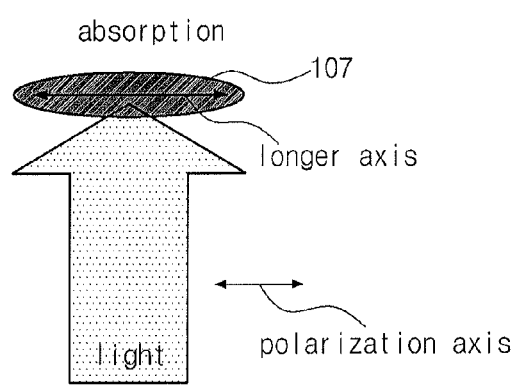
FIGS. 2A and 2B show an optical property of black dichroic dye.
Figure 2B:
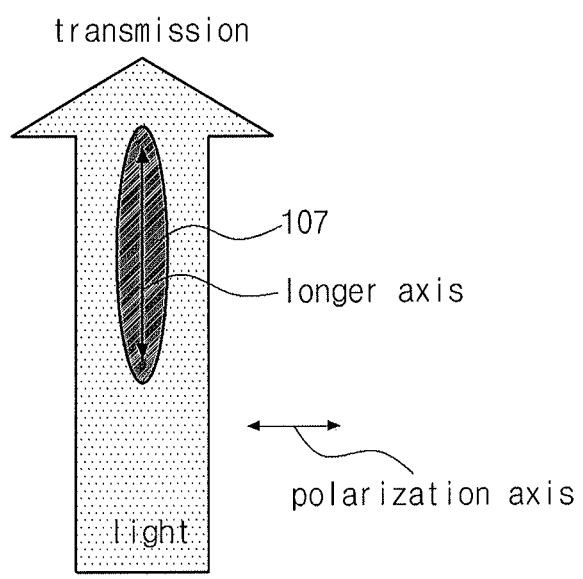

As shown in FIG. 2A, light having a polarization axis parallel to the long axis of the black dye material 107 is absorbed and blocked by the black dye material 107. As shown in FIG. 2B, light having a polarization axis perpendicular to the long axis of the black dye material 107 passes through the black dye material 107.

Returning to FIG. 1, a polarizing plate 119 having a transmission axis is disposed on an outer surface of the first substrate 101. Although not shown, first and second orientation films are formed on inner surfaces of the first and second substrates 101 and 102, respectively. The first and second orientation films have first and second orientation directions, respectively, e.g., through a rubbing process. The first orientation direction, e.g., the first rubbing direction, may be perpendicular to the transmission axis of the polarizing plate 119, and the second orientation direction, e.g., the second rubbing direction, may be perpendicular to the first orientation direction.

The black dye material 107 may include a dichroic dye having a black color. The dichroic dye may include one or more of azo dye, anthraquinone dye, azomethine dye, indigo dye, thioindigo dye, cyanine dye, indane dye, azulene dye, perylene dye, phthaloperine dye, and azine dye.

Although not shown, a plurality of gate lines, a plurality of first common lines, a plurality of second common lines and a plurality of data lines may be formed on the inner surface of the first substrate 101. The plurality of first common lines and the plurality of second common lines are parallel to the plurality of gate lines, and the plurality of data lines cross the plurality of gate lines to define a plurality of pixel regions. In addition, a thin film transistor (TFT) connected to a gate line and a data line may be formed in each pixel region. The TFT may include a gate electrode connected to the gate line, a gate insulating layer on the gate electrode, a semiconductor layer on the gate insulating layer corresponding to the gate electrode, a source electrode and a drain electrode contacting both ends of the semiconductor layer.

A first electrode 111 and a second electrode 113 are formed in pixel regions over the inner surface of the first substrate 101. Although not shown, a passivation layer is formed between the first and second electrodes 111 and 113. The first electrode 111 may be connected to the drain electrode of the TFT, and the second electrode 113 may be connected to the first common line. In addition, the first electrode 111 may have a plate shape corresponding to each pixel region, and the second electrode 113 may have a shape of a rectangular bar. The rectangular bars of the second electrode 113 may be disposed along a direction parallel to the first orientation direction and may be spaced apart from each other, with to have an open portions OP. The first and second electrodes 111 and 113 may be disposed such that an electric field between the first and second electrodes 111 and 113 is generated along a direction parallel to the second orientation direction.

A third electrode 115 is formed on an inner surface of the second substrate 102. The third electrode 115 may be connected to the second common line and may have a plate shape. The first, second and third electrodes 111, 113 and 115 may include a transparent conductive material such as indium-tin oxide (ITO) and indium-zinc-oxide (IZO).

The transparent LCD device 100 may have (or operating in) one of a transparent state, a color state and a dark state by transmitting or blocking light using a vertical electric field and a horizontal electric field, e.g., a fringe field. For example, when no electric field is generated among the first, second and third electrodes 111, 113 and 115 due to no applied voltage, the transparent LCD device 100 may have the transparent state or operate in a transparent mode where an object image at one side of the transparent LCD device 100 is visible through the other side of the transparent LCD device 100. When the vertical electric field is generated between the first and third electrodes 111 and 115, the transparent LCD device 100 operates in the color state or color mode where a displayed image by the liquid crystal panel 110 is displayed by the transparent LCD device 100. When the horizontal electric field is generated between the first and second electrodes 111 and 113, the LCD device may have the dark state or dark mode where no light is emitted from or through the transparent LCD device 100.

As a result, when no electric field is generated among the first, second and third electrodes 111, 113 and 115, light from the opposite side may pass through the liquid crystal layer 105 so that the transparent LCD device 100 can be in the transparent state as an initial state. Further, when the vertical electric field is generated between the first and third electrodes 111 and 115, light from the backlight unit 120 may be supplied to the liquid crystal layer 105 so that the transparent LCD device 100 can operate in the color state. In addition, when the horizontal electric field is generated between the first and second electrodes 111 and 113, the long axis of the black dye material 107 aligned along a direction of the horizontal electric field by the liquid crystal molecules 106 absorbs a light having a polarization axis parallel to the long axis of the black dye material 107. As a result, light from the opposite side or from the backlight unit 120 may be blocked by the liquid crystal layer 105 so that the transparent LCD device 100 can have the dark state.

A color filter layer 117 including red, green and blue color filters 117a, 117b and 117c is formed an outer surface of the second substrate 102. The red, green and blue color filters 117a, 117b and 117c correspond to the pixel region, and may be alternately disposed with each other. In addition, the red, green and blue color filters 117a, 117b and 117c may include red, green and blue dye materials, respectively, and the red, green and blue dye materials may have a long axis parallel to the transmission axis of the polarizing plate 119 and a short axis perpendicular to the long axis.

The corresponding color component of light with a polarization axis parallel to the long axis of the red, green and blue dye materials and light having a polarization axis perpendicular to the long axis of the red, green and blue dye materials passes through the red, green and blue color filters 117a, 117b and 117c. The other color component of light having a polarization axis parallel to the long axis of the red, green and blue dye materials is absorbed by the red, green and blue color filters 117a, 117b and 117c. For example and with respect to the red color filter 117a, red colored light having a polarization axis parallel to the long axis of the red dye material and light having a polarization axis perpendicular to the long axis of the red dye material passes through the red color filter 117a, whereas green and blue colored light having polarization axis's parallel to the long axis of the red dye material is absorbed by the red color filter 117a.

In the initial state, light from the opposite side of the transparent LCD device 100 passes through the polarizing plate 119 and the liquid crystal layer 105. The polarization plate 119 and the liquid crystal layer 105 cause the light to have a polarization axis perpendicular to the long axis of the red, green and blue dye materials. As a result, light from the opposite side may pass through the red, green and blue color filters 117a, 117b and 117c so that the transparent LCD device 100 can have the transparent state. Further, when the vertical electric field is generated between the first and third electrodes 111 and 115, light from the backlight unit 120 passes through the polarizing plate 119 and the liquid crystal layer 105. As described in greater detail below, the transparent LCD device 100 causes the light to have a polarization axis parallel to the long axis of the red, green and blue dye materials. As a result, the corresponding color component of light from the backlight unit 120 may pass through the red, green and blue color filters 117a, 117b and 117c so that the transparent LCD device 100 can operate in the color state.

The red, green and blue dye materials may include a dichroic dye having respective red, green and blue colors. The dichroic dye may include one of azo dye, anthraquinone dye, azomethine dye, indigo dye, thioindigo dye, cyanine dye, indane dye, azulene dye, perylene dye, phthaloperine dye and azine dye.

For example, each of red, green and blue dye materials may include about 1 to about 98.85 parts by weight of dichroic dye and about 0.15 to about 5 parts by weight of an additive. When the dichroic dye is smaller than about 1 parts by weight, the polarization effect of the color filter layer 117 is reduced. When the dichroic dye is greater than about 98.85 parts by weight, durability of the color filter layer 117 is reduced due to reduction in hardness. The additive may include any combination of a catalyst, sensitizer, stabilizer, chain transfer agent, inhibitor, accelerator, surfactant, lubricant, moisturizing agent, dispersing agent, hydrophobizing agent, bonding agent, flow enhancer, foam inhibitor, diluent, coloring agent, dye and pigment. The additive may be properly selected and mixed, when necessary.

The red, green and blue color filters 117a, 117b and 117c of dye material may have an excellent durability against high temperature and high humidity. In addition, since the dye material is not a particle such as a color pigment, reduction in polarization degree and contrast ratio due to scattering by the color pigment is prevented. As a result, polarization degree and resolution are improved.

Specifically, since the red, green and blue color filters 117a, 117b and 117c include the dichroic dye, a color may be generated by an additive color mixture. While the conventional red, green and blue color filters that include a color pigment generate a color by a subtractive color mixture where brightness is reduced, the red, green and blue color filters 117a, 117b and 117c may generate a color by an additive color mixture where brightness increases. As a result, light loss is prevented and color reproducibility is improved.

While mixture of complementary colors by the subtractive color mixture method is done through mixing a gray or black color, mixture of complementary colors by the additive color mixture is done through mixing a white color. For example, mixture of magenta and yellow by the subtractive color mixture may be done by making red darker than magenta or yellow. In the subtractive mixture, light having a wavelength band corresponding to two colors passes through the two colors and light having the other wavelength band is absorbed by the two colors. Mixture of red and green by the additive color mixture may be done by making yellow brighter than red or green. In addition, mixture of green and blue purple by the additive color mixture may be done by making cyan brighter than the green or blue purple, and mixture of blue purple and red by the additive color mixture may be done by making magenta brighter than the blue purple or red. In the additive mixture, the amount of incident light (e.g., incident to the eyes of a viewer) increases by mixture in the additive color mixture.

Although not shown, the backlight unit 120 may include a light source and a light guide plate adjacent to light source. Light from the light source may be transmitted through light guide plate to the liquid crystal panel 110. The light source may include a fluorescent lamp such as a cold cathode fluorescent lamp (CCFL) and an external electrode fluorescent lamp (EEFL), or a light emitting diode (LED).

The transparent LCD device 100 according to the first embodiment of the present invention operates in a guest-host mode having a transparent state, a color state and a dark state. The liquid crystal layer 105 includes the liquid crystal material 106 as a host and the black dye material 107 as a guest. The first orientation film over the inner surface of the first substrate 101 has the first orientation direction perpendicular to the transmission axis of the polarizing plate 119. The first and second electrodes 111 and 113 are formed over the inner surface of the first substrate 101, and the third electrode 115 is formed over the inner surface of the second substrate 102. The red, green and blue color filters 117a, 117b and 117c including red, green and blue dye materials, respectively, are formed over the outer surface of the second substrate 102. When no electric field is generated among the first, second and third electrodes 111, 113 and 115, the transparent LCD device 100 operates in the transparent state where an object image at one side of the transparent LCD device 100 is viewable through the opposite side of the transparent LCD device 100. When a vertical electric field is generated between the first and third electrodes 111 and 115, the transparent LCD device 100 operates in the color state to display an image, e.g., according to data signals or data voltages applied pixels or sub-pixels of the LCD device 100. When a horizontal electric field is generated between the first and second electrodes 111 and 113, the transparent LCD device 100 operates in the dark state to display a black background.

As a result, visibility of an opposite object (e.g., an object behind or through the transparent LCD device 100) can be realized and clarity of a displayed image is improved. In addition, since one polarizing plate is omitted, light loss due to the polarizing plate is prevented and the transparent LCD device 100 has a thin profile. Further, since the color filter layer 117 includes color dye material instead of a color pigment, light loss due to the color pigment is prevented and brightness and color reproducibility are improved.

Figure 3A:
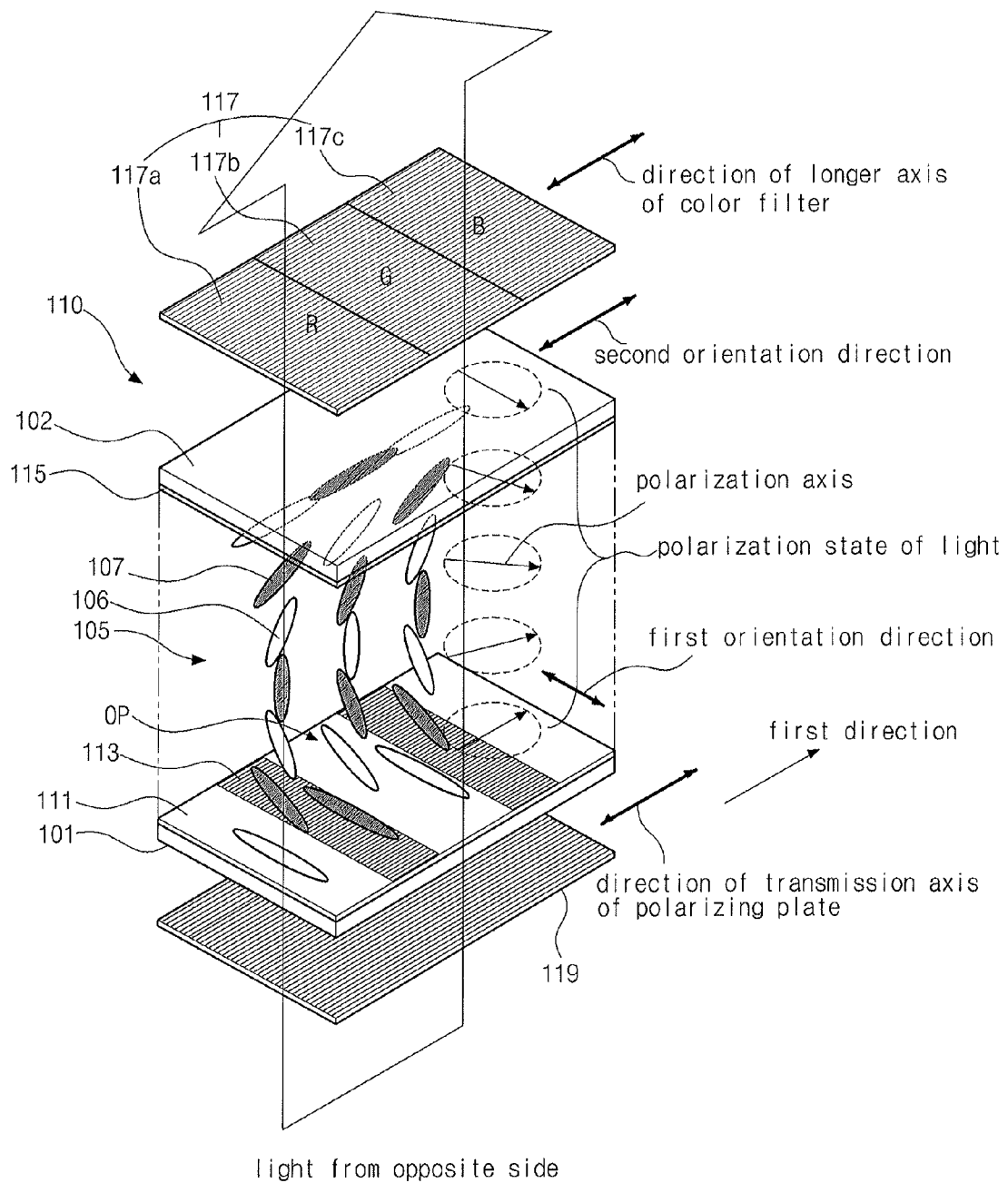
FIGS. 3A to 3C show a transparent state, a color state and a dark state, respectively, of a transparent LCD device according to a first embodiment of the present invention.
Figure 3B:
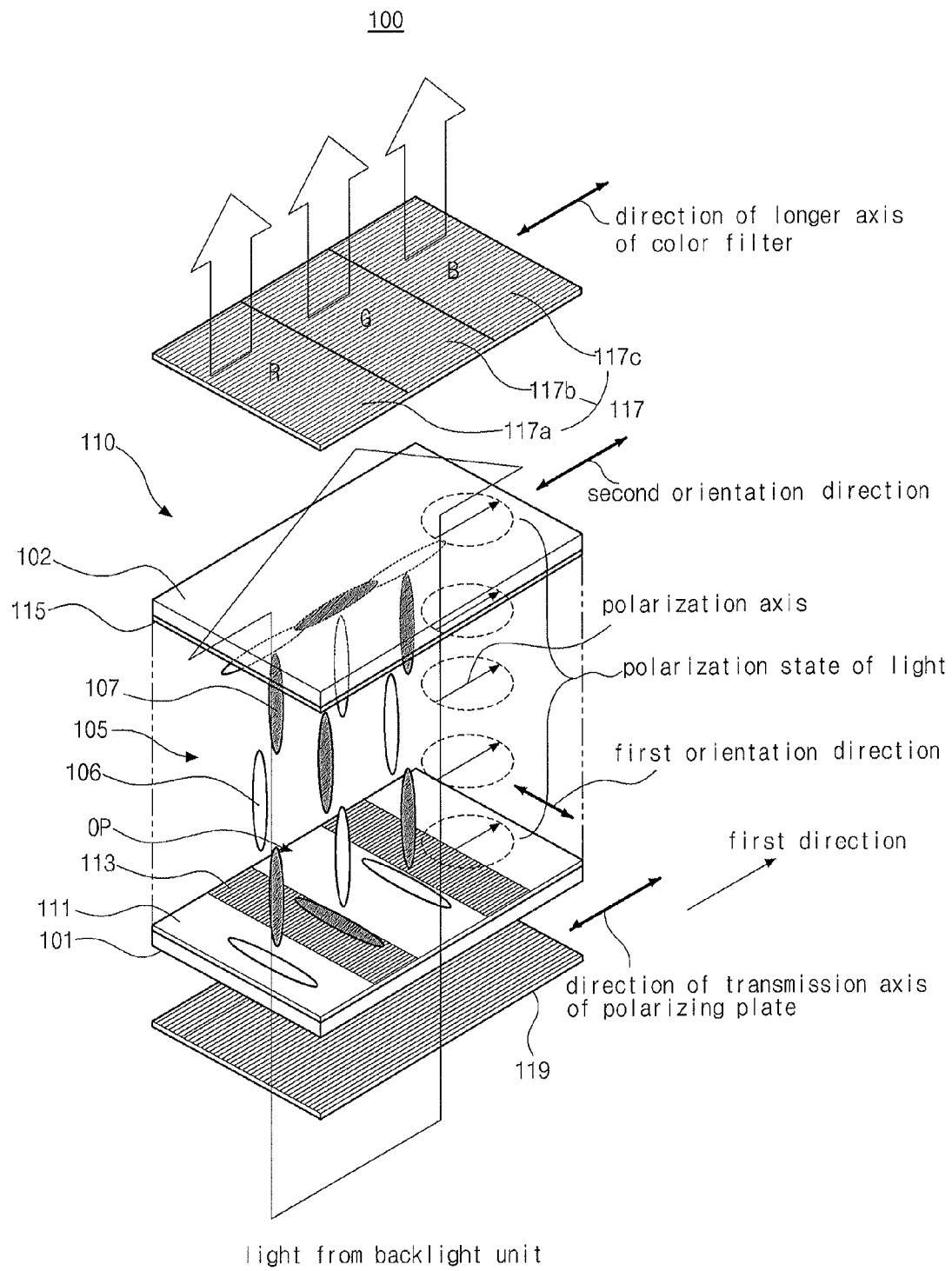
Figure 3C:
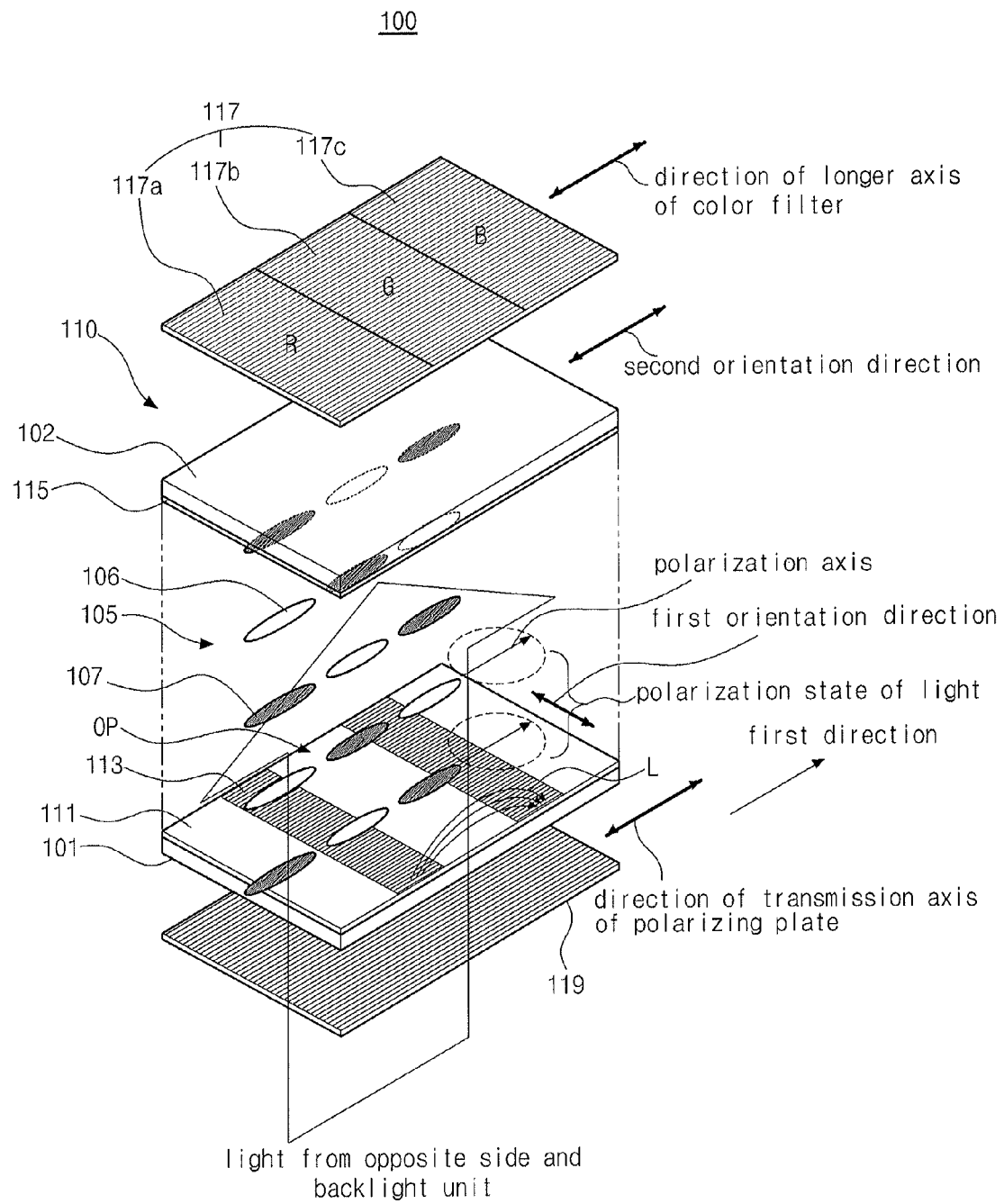

FIGS. 3A to 3C show a transparent state, a color state and a dark state, respectively, of a transparent LCD device according to a first embodiment of the present invention.

As shown in FIGS. 3A to 3C, the liquid crystal panel 110 includes the first substrate 101 having the first electrode 111 of a plate shape and the second electrode 113 of a shape of bars having an open portion OP, the second substrate 102 having the third electrode 115, and the liquid crystal layer 105 including the liquid crystal material 106 and the black dye material 107. The first and second electrodes 111 and 113 may be electrically separated from each other by a passivation layer of an insulating material. The polarizing plate 119 having a transmission axis parallel to a first direction (e.g., the first direction shown in FIG. 3A) is disposed over the outer surface of the first substrate 101, and the color filter layer 117 having the long axis parallel to the first direction are formed on the outer surface of the second substrate 102. The color filter layer 117 includes the red, green and blue color filters 117a, 117b and 117c including red, green and blue dye materials, respectively. The red, green and blue dye materials each have a longer axis parallel to the first direction. Although not shown, the first orientation film having the first orientation direction perpendicular to the first direction is formed over the inner surface of the first substrate 101 and the second orientation film having the second orientation direction parallel to the first direction is formed over the inner surface of the second substrate 102.

The liquid crystal layer 105 has a twisted nematic (TN) mode where longer axes of the liquid crystal material 106 are aligned to be twisted from the first substrate 101 to the second substrate 102. The liquid crystal panel 110 normally operates in a white mode where white is displayed when no voltages are applied to the first, second and third electrodes 111, 113 and 115. In addition, the liquid crystal panel 110 operates in a guest-host mode where the black dye material 107 of a guest is aligned according to the liquid crystal material 106 of a host.

As shown in FIG. 3A, when no voltages are applied to the first, second and third electrodes 111, 113 and 115 and the backlight unit is turned off, the non-polarized light from the opposite side of the transparent LCD device 100 passes through the polarizing plate 119 to have a polarization axis parallel to the first direction of the transmission axis of the polarizing plate 119. When light enters the liquid crystal layer 105, a first polarization component of the light parallel to the long axis of the black dye material 107 is absorbed by the black dye material 107 and a second polarization component of the light perpendicular to the long axis of the black dye material 107 is transmitted through the black dye material 107. Since the long axis of the black dye material 107 adjacent to the first substrate 101 is aligned along the first orientation direction perpendicular to the first direction, light having a polarization axis parallel to first direction is transmitted through the black dye material 107.

When light passes through the liquid crystal layer 105, the polarization axis of light rotates according to the twisted alignment of the liquid crystal layer 105 to be perpendicular to the first direction. When light enters the color filter layer 117, a first component of the light having a polarization axis parallel to the long axis of the red, green and blue dye materials and different respective color from the red, green and blue dye materials is respectively absorbed by the red, green and blue color filters 117a, 117b and 117c. A second component of the light having a polarization axis parallel to the long axis of the red, green and blue dye materials and same respective color as the red, green and blue dye materials and a third component of the light having a polarization axis perpendicular to the long axis of the red, green and blue dye materials are transmitted through the red, green and blue color filters 117a, 117b and 117c. Since the longer axes of the red, green and blue dye materials are aligned along the first direction, light having a polarization axis perpendicular to the first direction is transmitted through the red, green and blue color filters 117a, 117b and 117c. As a result, in a transparent state of the transparent LCD device 100 where no voltages are applied to the first, second and third electrodes 111, 113 and 115 and the backlight unit is turned off, light from the opposite side is transmitted through the transparent LCD device 100 so that an object image at the opposite side can be apparently discriminated (e.g., viewed) through the transparent LCD device 100.

As shown in FIG. 3B, when voltages are applied to the first and third electrodes 111 and 115, a vertical electric field is generated between the first and third electrodes 111 and 115 and the liquid crystal layer 105 is re-aligned by the vertical electric field such that the longer axes of the liquid crystal material 106 and the black dye material 107 are parallel to the vertical electric field. The non-polarized light from the backlight unit passes through the polarizing plate 119 to have a polarization axis parallel to the first direction of the transmission axis of the polarizing plate 119. With reference to absorption and transmission of the black dye material 107 illustrated in FIG. 3A, since the long axis of the black dye material 107 is re-aligned along the vertical electric field perpendicular to the first direction, light having the polarization axis parallel to first direction is transmitted through the black dye material 107.

While light passes through the liquid crystal layer 105, the polarization axis of light does not rotate because the liquid crystal layer 105 is aligned along the vertical electric field. With reference to absorption and transmission of the red, green and blue dye materials illustrated in FIG. 3A, since the longer axes of the red, green and blue dye materials are aligned along the first direction, light having the polarization axis parallel to the first direction and the same respective color as the red, green and blue dye materials is transmitted through the red, green and blue color filters 107a, 107b and 107c. For example, the red component of light having a polarization axis parallel to the first direction may be transmitted through the red color filter 107a, the green component of light having a polarization axis parallel to the first direction may be transmitted through the green color filter 107b, and the blue component of light having a polarization axis parallel to the first direction may be transmitted through the blue color filter 107c. As a result, in a color state of the transparent LCD device 100 where voltages for displaying an image are applied to the first and third electrodes 111 and 115, light from the backlight unit is transmitted through the transparent LCD device 100 so that a displayed image can be viewed through the transparent LCD device 100.

As shown in FIG. 3C, when voltages are applied to the first and second electrodes 111 and 113, the horizontal electric field L is generated between the first and second electrodes 111 and 113 and the liquid crystal layer 105 at a lower portion adjacent to the first and second electrodes 111 and 113 is re-aligned by the horizontal electric field L such that the longer axes of the liquid crystal material 106 and the black dye material 107 are parallel to the first direction. Non-polarized light from the opposite side and/or light from the backlight unit passes through the polarizing plate 119 to have a polarization axis parallel to the first direction of the transmission axis of the polarizing plate 119. With reference to absorption and transmission of the black dye material 107 illustrated in FIG. 3A, since the long axis of the black dye material 107 is re-aligned along the horizontal electric field L parallel to the first direction, light having the polarization axis parallel to first direction is absorbed by the black dye material 107. As a result, in a dark state of the transparent LCD device 100 where voltages applied to the first and second electrodes 111 and 113, light from the opposite side and the backlight unit is absorbed by the transparent LCD device 100 so that a black image is displayed by the transparent LCD device 100.

In the transparent LCD device 100 according to the first embodiment of the present invention, the object image at the opposite side of the transparent LCD device 100 is apparently discriminated in the transparent state, and the displayed image is viewed in the color state. Put another way, in the transparent state, the transparent LCD device 100 displays an object behind or on the opposite side of the transparent LCD device 100 and in the color state, the LCD device 100 may operate to present any displayed image according to supplied data signals associated with the displayed image received through one or more data lines. In addition, since an additional polarizing plate over the outer surface of the second substrate 102 is omitted, light loss due to the polarizing plate is prevented and the transparent LCD device 100 has a thinner profile. Further, since the red, green and blue color filters 117a, 117b and 117c include the red, green and blue dichroic dye materials, respectively, light loss due to a color pigment is prevented and brightness and color reproducibility are improved.

Figure 4A:
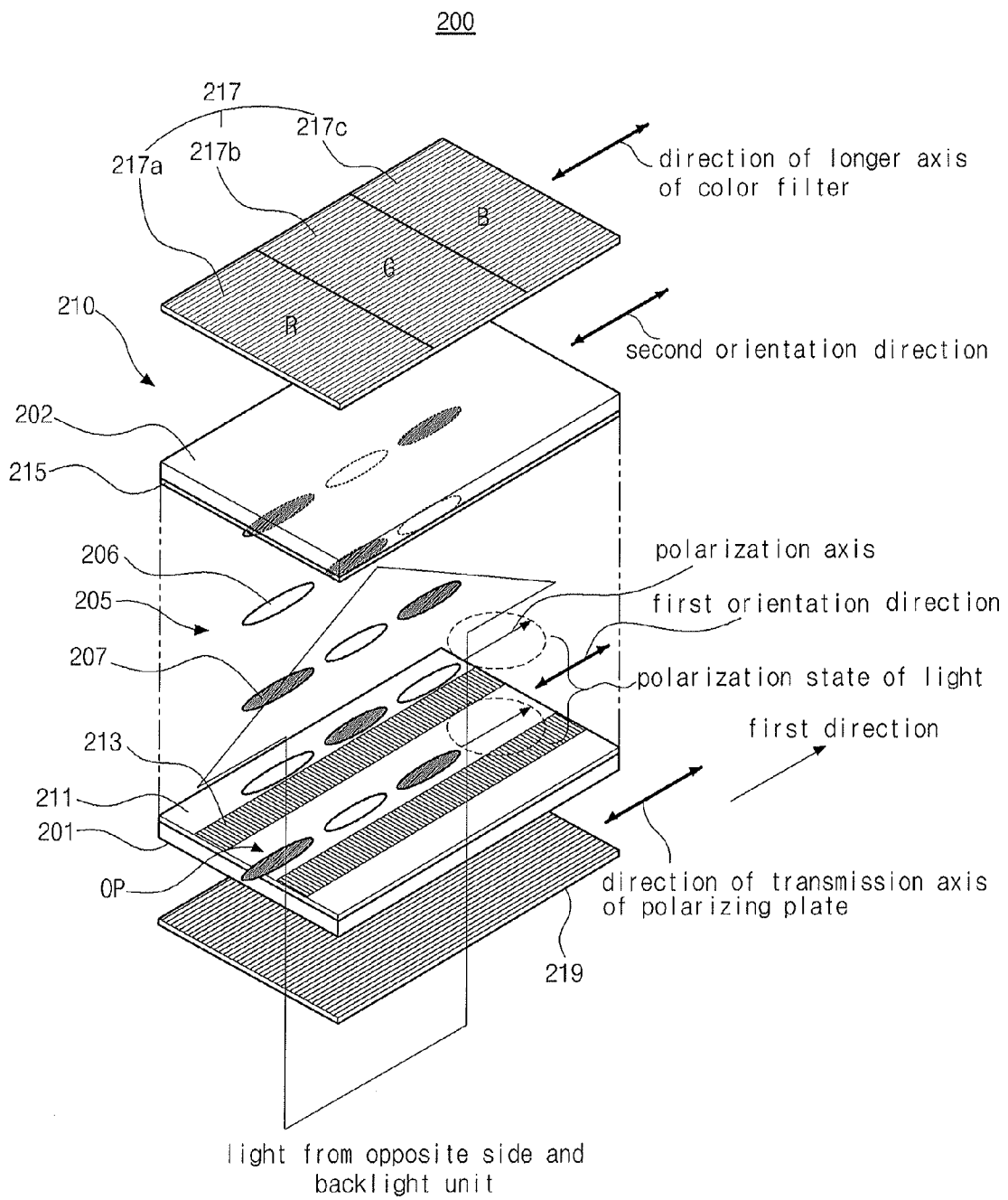
FIGS. 4A to 4C show a dark state, a color state and a transparent state, respectively, of a transparent liquid crystal display (LCD) device according to a second embodiment of the present invention.
Figure 4B:
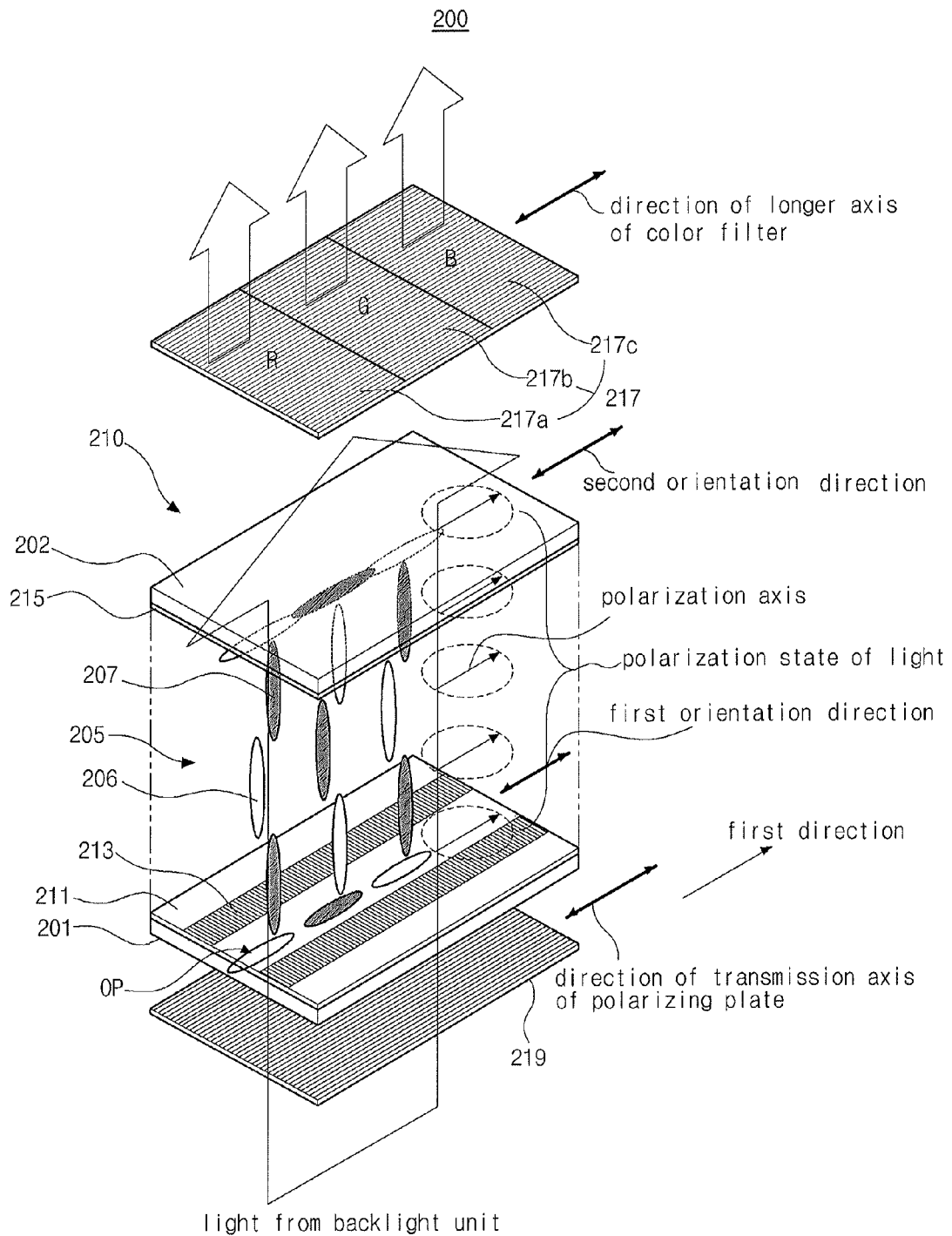
Figure 4C:
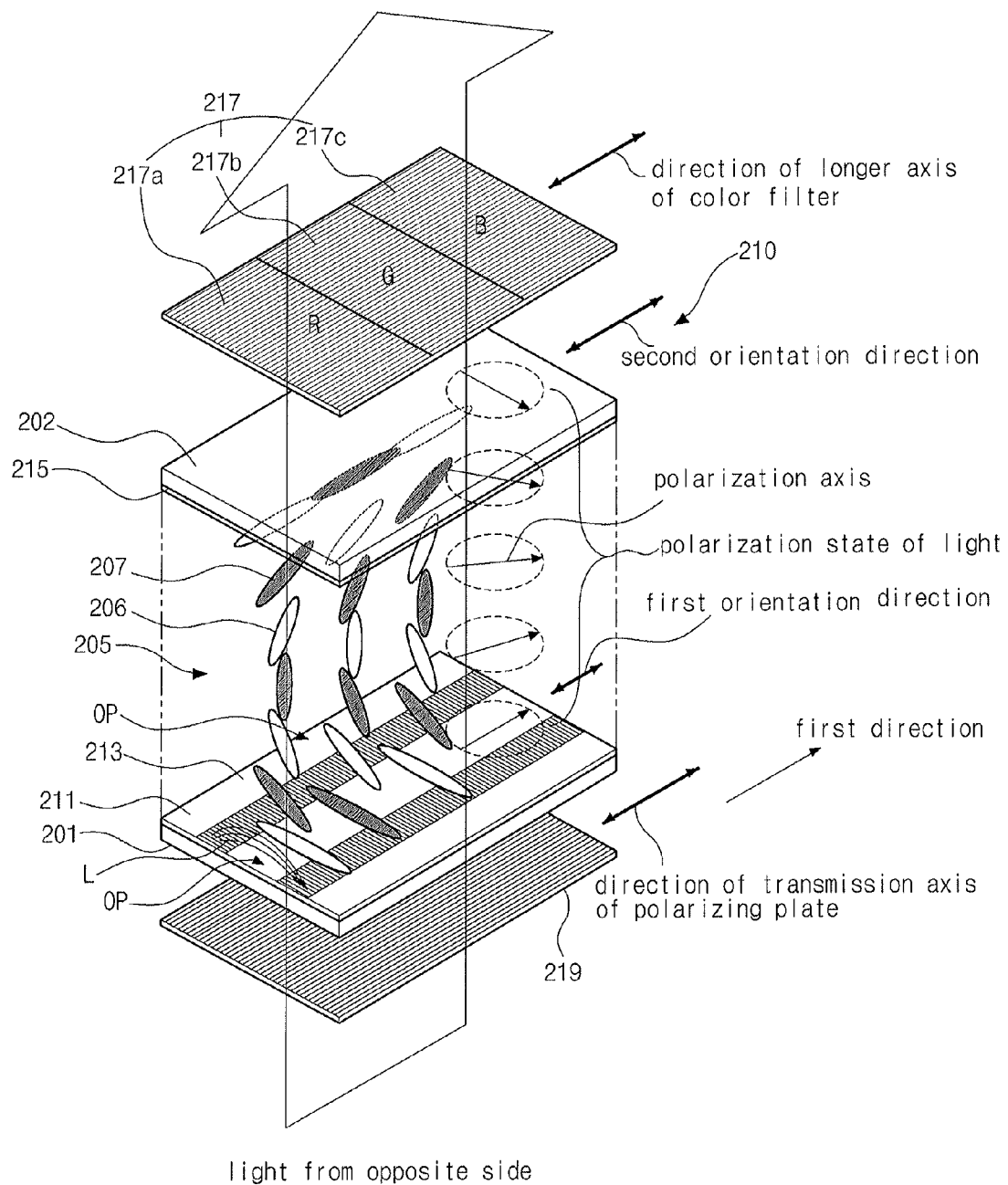

FIGS. 4A to 4C show a dark state, a color state and a transparent state, respectively, of a transparent liquid crystal display (LCD) device 200 according to a second embodiment of the present invention.

As shown in FIGS. 4A to 4C, the liquid crystal panel 210 includes a first substrate 201 having a first electrode 211 of a plate shape and a second electrode 113 of a bar shape, a second substrate 202 having a third electrode 215, and a liquid crystal layer 205 including a liquid crystal material 206 and a black dye material 207. The first and second electrodes 211 and 213 may be electrically separated from each other by a passivation layer of an insulating material. In addition, the bars of the second electrode 213 may be disposed along a first direction (e.g., the first direction shown in FIGS. 4A-4C) and spaced apart from each other to have an open portion OP. A polarizing plate 219 having a transmission axis parallel to the first direction is disposed over the outer surface of the first substrate 201, and a color filter layer 217 having a long axis parallel to the first direction are formed on the outer surface of the second substrate 202. The color filter layer 217 includes the red, green and blue color filters 217a, 217b and 217c including red, green and blue dye materials, respectively. As shown in FIGS. 4A to 4C, the longer axes of the red, green and blue dye materials are parallel to the first direction. Although not shown, a first orientation film having a first orientation direction parallel to the first direction is formed over the inner surface of the first substrate 201 and a second orientation film having a second orientation direction parallel to the first direction is formed over the inner surface of the second substrate 202.

The liquid crystal layer 205 has an electrically controlled birefringence (ECB) mode where longer axes of the liquid crystal material 206 are aligned to be parallel to each other from the first substrate 201 to the second substrate 202. The liquid crystal panel 210 may operate in a black mode where black is displayed when no voltages are applied to the first, second and third electrodes 211, 213 and 215. In addition, the liquid crystal panel 210 operates in a guest-host mode where the black dye material 207 of a guest is aligned according to the liquid crystal material 206 of a host.

As shown in FIG. 4A, when no voltages are applied to the first, second and third electrodes 211, 213 and 215, non-polarized light from an opposite side of the transparent LCD device 200 and a backlight unit (not shown) passes through the polarizing plate 219 to have a polarization axis parallel to the first direction of the transmission axis of the polarizing plate 219. When light enters the liquid crystal layer 205, a first polarization component of light parallel to the long axis of the black dye material 207 is absorbed by the black dye material 207 and a second polarization component of light perpendicular to the long axis of the black dye material 207 is transmitted through the black dye material 207. Since the long axis of the black dye material 207 is aligned along the first orientation direction parallel to the first direction, light having a polarization axis parallel to the first direction is absorbed by the black dye material 207. As a result, in a dark state of the transparent LCD device 200 where no voltages are applied to the first, second and third electrodes 211, 213 and 215, light from the opposite side and the backlight unit is absorbed by the transparent LCD device 200 so that a black image is displayed through the transparent LCD device 200.

As shown in FIG. 4B, when voltages are applied to the first and third electrodes 211 and 215, a vertical electric field is generated between the first and third electrodes 211 and 215 and the liquid crystal layer 205 is re-aligned by the vertical electric field such that the longer axes of the liquid crystal material 206 and the black dye material 207 are parallel to the vertical electric field. Non-polarized light from the backlight unit passes through the polarizing plate 219 to have a polarization axis parallel to the first direction of the transmission axis of the polarizing plate 219. With reference to absorption and transmission of the black dye material 207 illustrated in FIG. 4A, since the long axis of the black dye material 207 is re-aligned along the vertical electric field perpendicular to the first direction, light having a polarization axis parallel to first direction is transmitted through the black dye material 207.

While light passes through the liquid crystal layer 205, the polarization axis of light does not rotate because the liquid crystal layer 205 is aligned along the vertical electric field. When light enters the color filter layer 207, a first component of the light having a polarization axis parallel to the long axis of the red, green and blue dye materials and different colors respectively from the red, green and blue dye materials is respectively absorbed by the red, green and blue color filters 207a, 207b and 207c. A second component of the light having a polarization axis parallel to the long axis of the red, green and blue dye materials and same respective colors as the red, green and blue dye materials and a third component of the light having a polarization axis perpendicular to the long axis of the red, green and blue dye materials are respectively transmitted through the red, green and blue color filters 207a, 207b and 207c. Since the longer axes of the red, green and blue dye materials are aligned along the first direction, light having the polarization axis parallel to the first direction and the same respective colors as the red, green and blue dye materials is respectively transmitted through the red, green and blue color filters 207a, 207b and 207c. For example, the red component of light having a polarization axis parallel to the first direction may be transmitted through the red color filter 207a, the green component of light having a polarization axis parallel to the first direction may be transmitted through the green color filter 207b, and the blue component of light having a polarization axis parallel to the first direction may be transmitted through the blue color filter 207c. As a result, in a color state of the transparent LCD device 200 where voltages for displaying an image are applied to the first and third electrodes 211 and 215, light from the backlight unit is transmitted through the transparent LCD device 200 so that a displayed image can be viewed through the transparent LCD device 200.

As shown in FIG. 4C, when voltages are applied to the first and second electrodes 211 and 213 and the backlight unit is turned off, a horizontal electric field L is generated between the first and second electrodes 211 and 213 and the liquid crystal layer 205 at a lower portion adjacent to the first and second electrodes 211 and 213 is re-aligned by the horizontal electric field L such that the longer axes of the liquid crystal material 206 and the black dye material 207 are perpendicular to the first direction. As a result, the liquid crystal layer 205 may have a twisted nematic (TN) type where the longer axes of the liquid crystal material 206 are aligned to be twisted from the first substrate 201 to the second substrate 202. Non-polarized light from the opposite side of the transparent LCD device 200 passes through the polarizing plate 219 to have a polarization axis parallel to the first direction of the transmission axis of the polarizing plate 219. With reference to absorption and transmission of the black dye material 207 illustrated in FIG. 4C, since the long axis of the black dye material 207 at the lower portion is re-aligned along the horizontal electric field L perpendicular to the first direction, light having the polarization axis parallel to first direction is transmitted through the black dye material 207.

While light passes through the liquid crystal layer 205, the polarization axis of light rotates according to the twisted alignment of the liquid crystal layer 205 to be perpendicular to the first direction. With reference to absorption and transmission of the red, green and blue dye materials illustrated in FIG. 4C, since the longer axes of the red, green and blue dye materials are aligned along the first direction, light having a polarization axis perpendicular to the first direction is respectively transmitted through the red, green and blue color filters 217a, 217b and 217c. As a result, in a transparent state of the transparent LCD device 200 where voltages are applied to the first and second electrodes 211 and 213 and the backlight unit is turned off, light from the opposite side is transmitted through the transparent LCD device 200 so that an object image at the opposite side can be apparently discriminated (e.g., viewed) through the transparent LCD device 200.

In the transparent LCD device 200 according to the second embodiment of the present invention, the object image at the opposite side of the transparent LCD device 200 is apparently discriminated in the transparent state, and the transparent LCD device 200 operates to display images in the color state. In addition, since an additional polarizing plate over the outer surface of the second substrate 202 is omitted, light loss due to the polarizing plate is prevented and the transparent LCD device 200 has a thinner profile. Further, since the red, green and blue color filters 217a, 217b and 217c include the red, green and blue dichroic dye materials, respectively, light loss due to a color pigment is prevented and brightness and color reproducibility are improved. Moreover, since the liquid crystal layer 205 has the ECB mode, response speed and contrast ratio are improved.

It will be apparent to those skilled in the art that various modifications and variations can be made in a display device of the present disclosure without departing from the sprit or scope of the invention. Thus, it is intended that the present invention covers the modifications and variations of this invention provided they come within the scope of the appended claims and their equivalents.

What is claimed is:

1. A display device, comprising:
    first and second substrates spaced apart from each other;
    a polarizing plate over an outer surface of the first substrate;
    first and second electrodes and a passivation layer between the first and second electrodes over an inner surface of the first substrate;
    a third electrode over an inner surface of the second substrate;
    a color filter over an outer surface of the second substrate, the color filter comprising a colored dichroic dye material; and
    a liquid crystal layer between the first and second substrate, the liquid crystal layer comprising a liquid crystal material and a black dichroic dye material.

2. The display device according to claim 1, wherein a long axis of the black dichroic dye material is aligned to be parallel to a long axis of the liquid crystal material.

3. The display device according to claim 1, wherein a light having a polarization axis parallel to a long axis of the black dichroic dye material is absorbed by the black dichroic dye material.

4. The display device according to claim 1, wherein a light incident to the color filter has a first component having a polarization axis parallel to a long axis of the colored dichroic dye material and a same color as the colored dichroic dye material, and a second component having a polarization axis parallel to the long axis of the colored dichroic dye material and a different color from the colored dichroic dye material, and wherein the first component is transmitted through the colored dichroic dye material and the second component is absorbed by the colored dichroic dye material.

5. The display device according to claim 1, further comprising:
    a first orientation film on the inner surface of the first substrate, where the first orientation film has a first orientation direction;
    a second orientation film on the inner surface of the second substrate where the second orientation film as a second orientation direction; and
    where the first orientation direction is perpendicular or parallel to the second orientation direction.

6. The display device according to claim 5, wherein the first orientation direction is perpendicular to a transmission axis of the polarizing plate;
    wherein the second electrode is disposed along a direction perpendicular to the transmission axis of the polarizing plate;
    wherein the liquid crystal layer operates in a twisted nematic mode where longer axes of the liquid crystal material are aligned to be twisted from the first substrate to the second substrate when no voltage is applied to the first, second, and third electrodes;
    wherein the second orientation direction is parallel to the transmission axis of the polarizing plate; and
    wherein a long axis of the colored dichroic dye material is parallel to the transmission axis.

7. The display device according to claim 6, wherein when no voltage is applied to the first, second and third electrodes, a light having an original color and incident to the first substrate is transmitted through the liquid crystal layer and the color filter, where the transmitted light has the original color.

8. The display device according to claim 6, wherein when voltage is applied to the first and third electrodes to generate a vertical electric field between the first and third electrodes, a light incident to the first substrate is transmitted through the liquid crystal layer and a colored light having a color corresponding to the color filter is outputted from the color filter.

9. The display device according to claim 6, wherein when voltage is applied to the first and second electrodes to generate a horizontal electric field between the first and second electrodes, a light incident to the first substrate is absorbed by the black dichroic dye material.

10. The display device according to claim 5, wherein the first orientation direction is parallel to a transmission axis of the polarizing plate,
    wherein the second electrode is disposed along a direction parallel to the transmission axis of the polarizing plate,
    wherein the liquid crystal layer operates in an electrically controlled birefringence mode where longer axes of the liquid crystal material are aligned to be parallel to each other from the first substrate to the second substrate when no voltage is applied to the first, second, and third electrodes,
    wherein the second orientation direction is parallel to the transmission axis of the polarizing plate, and
    wherein a long axis of the colored dichroic dye material is parallel to the transmission axis of the polarizing plate.

11. The display device according to claim 10, wherein when no voltage is applied to the first, second and third electrodes, a light incident to the first substrate is absorbed by the black dichroic dye material.

12. The display device according to claim 10, wherein when voltage is applied to the first and third electrodes to generate a vertical electric field between the first and third electrodes, a light incident to the first substrate is transmitted through the liquid crystal layer and a colored light having a color corresponding to the color filter is outputted from the color filter.

13. The display device according to claim 10, wherein when voltage is applied to the first and second electrodes to generate a horizontal electric field between the first and second electrodes, a light having an original color and incident to the first substrate is transmitted through the liquid crystal layer and the color filter, where the transmitted light has the original color.

14. The display device according to claim 1, wherein the black dichroic dye material comprises any combination of azo dye, anthraquinone dye, azomethine dye, indigo dye, thioindigo dye, cyanine dye, indane dye, azulene dye, perylene dye, phthaloperine dye and azine dye.

15. The display device according to claim 1, wherein the colored dichroic dye material comprises any combination of azo dye, anthraquinone dye, azomethine dye, indigo dye, thioindigo dye, cyanine dye, indane dye, azulene dye, perylene dye, phthaloperine dye and azine dye.

16. The display device according to claim 1, further comprising a backlight unit supplying a light under the first substrate.

17. The display device according to claim 1, where the first electrode comprises a plate shaped electrode and where the second electrode comprises at least one bar shaped electrode.

18. A display device, comprising:
a first substrate and a second substrate;
a polarizing plate over an outer surface of the first substrate;
first and second electrodes and a passivation layer between the first and second electrodes over an inner surface of the first substrate;
a third electrode over an inner surface of the second substrate;
a color filter over an outer surface of the second substrate, the color filter comprising a colored dichroic dye material; and
a liquid crystal layer between the first and second substrate, the liquid crystal layer including a liquid crystal material and a black dichroic dye material; and
where the display device is configured to:
operate in a transparent mode where an object on one side of the display device is visible through the other side of the display device;
operate in a color mode to present a displayed image according to data signals received through data lines; and
operate in a dark mode to display a black image.

* * * * *